W. L. DIXON.
AIR OPERATED ADAPTER.
APPLICATION FILED NOV. 2, 1920.

1,414,460.

Patented May 2, 1922.

INVENTOR
Walter L. Dixon
BY
Redding & Greeley
ATTORNEYS

UNITED STATES PATENT OFFICE.

WALTER L. DIXON, OF NEW BRUNSWICK, NEW JERSEY, ASSIGNOR TO INTERNATIONAL MOTOR COMPANY, OF NEW YORK, N. Y., A CORPORATION OF DELAWARE.

AIR-OPERATED ADAPTER.

1,414,460.  Specification of Letters Patent.  Patented May 2, 1922.

Application filed November 2, 1920. Serial No. 421,404.

*To all whom it may concern:*

Be it known that I, WALTER L. DIXON, a citizen of the United States, residing in New Brunswick, in the State of New Jersey, have invented certain new and useful Improvements in Air-Operated Adapters, of which the following is a specification, reference being had to the accompanying drawing, forming a part hereof.

This invention relates to what is termed in the art of an air operated adapter which is, briefly, a device operated by air for clamping work on an arbor while machining operations are carried on. More particularly the improved adapter is designed with reference to the clamping of work having an opening therethrough, although it will be evident to one skilled in the art that the principle of actuation for the clamping elements can be applied to adapters for any kind of work. Broadly speaking, the device comprises a supporting arbor or head for the work, an air operated plunger movable axially and having a tapered portion and radially movable clamping elements under the influence of said plunger and releasable by spring action. This broad principle in its particular adaptation is illustrated in the accompanying drawing in connection with an air operated adapter for clamping gear blanks on an arbor for turning operations. In accordance with the invention the arbor is so formed as to support the blank and carries on its face a plurality of radially movable spring-pressed clamps, the inner ends of which are engaged by a slidable air plunger which is moved axially through the work to force the clamps outwardly over the face of the blank. A suitable spring co-operates with the clamping elements to retract them from their position over the blank when the plunger is withdrawn.

In addition to the improvements described broadly and in some detail above there are certain other features of the invention, such as the provision of an automatic release for loosening the work on the arbor after the clamping elements are retracted and a spring-pressed guide for the sliding clamping elements which keep them from binding in their radial movements.

Reference is now to be had to the accompanying drawing for a detailed description of one suitable embodiment of the invention, in which drawing:—

Figure 1:
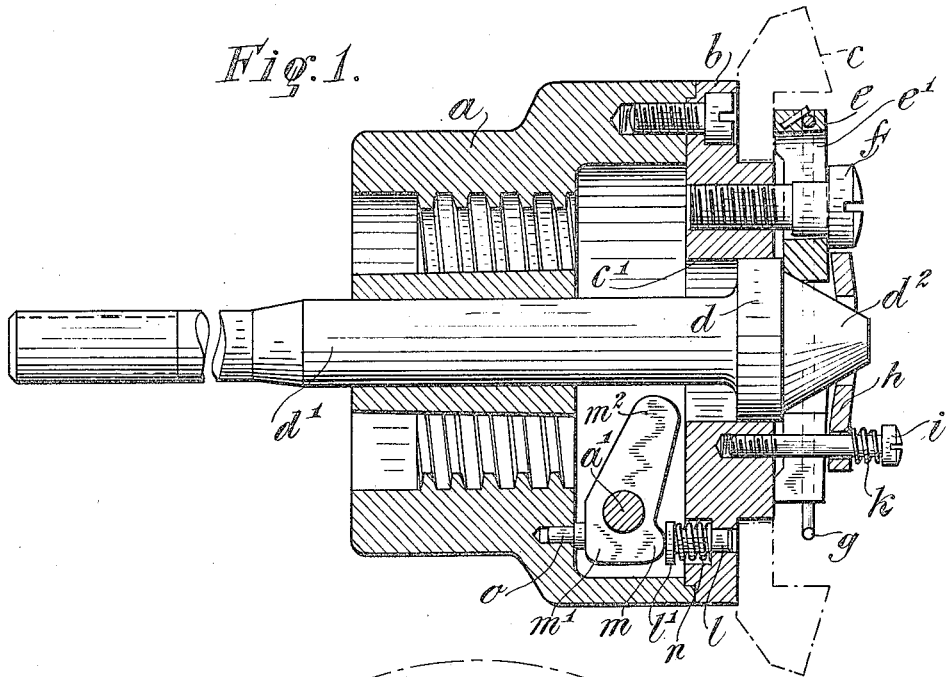
Figure 1 is a view in vertical section through an arbor provided with the improved adapter.
Figure 2:
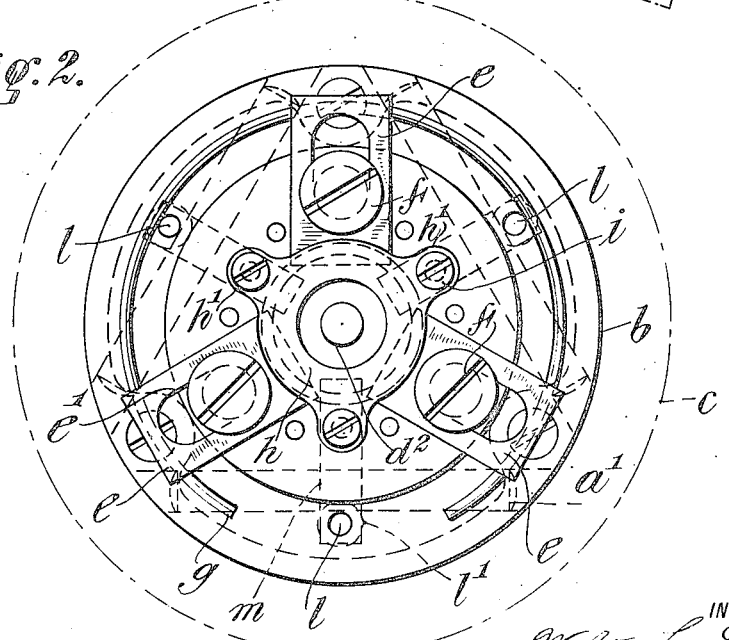
Figure 2 is a view in end elevation of the devices shown in Figure 1.

The circular head $a$ of the machine has bolted thereto a face plate $b$ which is formed as an arbor to support the work to be operated on, such as a bevel gear blank $c$, indicated in dotted lines. The arbor is recessed centrally, as at $c'$, to receive the head $d$ of an air operated plunger $d'$ movable axially under the influence of compressed air. On the face of the adapter are mounted a plurality of radially movable clamping elements, indicated as bars $e$, slotted, as at $e'$, to receive supporting bolts $f$ carried in the face of the arbor. In the illustrated embodiment three such clamping elements $e$ are mounted on the arbor and are naturally disposed at equidistant points. The three bars $e$ are normally forced towards the axis of the arbor by means of a suitable spring, such as a single spring wire $g$ which may encircle them all and be carried in their outer ends. It should be noted that the thickness of the bars $e$ is such as to afford a loose sliding fit between the heads of the bolts $f$ and the face of the arbor so that the clamps may actually tilt slightly when forced outwardly.

The nose of the plunger $d'$ is tapered, as at $d^2$, and in the illustrated embodiment is formed as the frustrum of a cone. The inner ends of the sliding clamps $e$ may be correspondingly tapered and bear against the tapered nose $d^2$.

In operation, before the work $c$ is placed on the arbor, the air plunger $d'$ will be found in retracted position and the spring $g$ will force the clamps inwardly to a point where their outer ends will permit the work to be slipped over them to its seat on the arbor $b$. When the work is in place the plunger $d'$, by means of compressed air, is forced outwardly and the tapered nose $d^2$ co-operating with the inner ends of the clamps $e$ will force the clamps outwardly along radial lines and against the action of the retracted spring $g$. The outer ends of the clamps will slide across the face of the work and clamp it securely on to the arbor. By reason of the loose sliding fit of the clamps under the heads of the bolts $f$ the clamps can tilt slightly so that the outer ends will be pressed against the face of the work. In some cases it may be found that the tilting of these clamps results in a binding stress being set up between them and the heads of the bolts $f$. To overcome this, it may be found desirable to press the inner ends of the clamps yieldingly towards the face of the arbor. A convenient means for accomplishing this is found in the presser ring $h$ which can be mounted within the heads of the bolts $f$ and carried slidably on studs $i$ which pass through the ring into the face of the arbor $b$. Between the heads of the studs $i$ and the presser ring can be interposed springs $k$ which constantly press the ring against the clamps $e$ and prevent them from binding against the heads of the bolts $f$ while moving outwardly. As a matter of design in the illustrated embodiment the ring $h$ is formed with ears $h'$ to receive the studs $i$. The invention is not limited to the employment of such a ring $h$ since other yielding presser means may be devised and, indeed, in some constructions, such means may be found entirely unnecessary.

Another feature of the invention resides in the incorporation in the head $a$ of a device for automatically loosening the work $c$ after the machining operation has been completed. Such means may comprise a spring-pressed plunger $l$ supported slidably in the arbor $b$ and having a head $l'$ engaged by a cam $m$ on a lever $m'$ which may be supported on a pin $a'$ within the head $a$, the other end $m^2$ of the lever lying in the path of movement of the plunger head $d$. When the plunger head $d$ is retracted, it engages the end $m^2$ of the lever and through engagement of the cam $m$ with the head $l'$ of the pin $l$, the pin will be forced outwardly beyond the face of the arbor and loosen the work $c$. When the work is placed on the arbor the pin $l$ will be forced to an operative position by the spring $n$, which lies under the head $l'$, and the lever arm $m^2$ will assume a set position in readiness for engagement by the plunger upon its retraction. Rocking movement of the lever $m'$ may be limited by a stop $o$ which the arm $m^2$ engages.

From the description given of the preferred embodiment, it will be understood that the invention is particularly adapted for the clamping of work having a central opening on an arbor since this permits an air operated plunger to move through such opening and co-operate directly with radially movable clamping elements which can be forced outwardly and directly overlie the face of the work. This central opening in the work need not, of course, be circular, since it can be rectangular, elliptical or other form and, this being true, it will also be obvious that the nose of the plunger need not be conical.

The invention will be covered in its principle as well as in the details of its particular adaptation in the appended claims.

I claim as my invention:

1. In combination with a supporting arbor for work, an air operated plunger reciprocable with relation to the arbor, clamping elements supported slidably on the face of the arbor and spaced from a part thereof and movable longitudinally over the face of the work which lies between the elements and the face of the arbor under the influence of said plunger, and means independent of the plunger to retract the clamping elements upon retraction of the plunger.

2. In combination with a centrally bored arbor an air operated plunger reciprocable through the opening in the arbor, studs secured in the face of the arbor, radially movable clamping elements supported slidably by said studs, yielding means to retract the clamping elements, tapered surfaces formed on the plunger and co-operating with the inner ends of said clamping elements to move the same outwardly over the face of the work, and yielding means co-operating with said clamping elements to press their inner ends towards the face of the arbor while permitting sliding movement thereof.

3. In combination with a centrally bored arbor an air operated plunger reciprocable through the opening in the arbor, studs secured in the face of the arbor, radially movable clamping elements supported slidably by said studs, yielding means to retract the clamping elements, tapered surfaces formed on the plunger and co-operating with the inner ends of said clamping elements to move the same outwardly over the face of the work, a spring pressed pin movable through the arbor to engage the work, and a lever having an arm in the path of movement of the plunger to move the pin against the work.

4. In combination with a circular arbor to support an annular gear blank, an air operated plunger reciprocable through said arbor, radially movable clamps supported in slotted engagement with a plate in the face of the arbor, a circular spring overlying the outer ends of said clamps to retract them, a tapered nose on the plunger engaging the inner ends of the clamps to move them outwardly over the face of the gear blank and a presser ring supported yieldingly on the face of the arbor and overlying the inner ends of the clamps.

5. In combination with a circular arbor to support an annular gear blank, an air operated plunger reciprocable through said arbor, radially movable clamps supported in slotted engagement with a plate in the face of the arbor, a circular spring overlying the outer ends of said clamps to retract them, a tapered nose on the plunger engaging the inner ends of the clamps to move them outwardly over the face of the gear blank, a spring-pressed pin movable through the arbor to loosen the work, and an actuating lever for the pin having an arm disposed in the path of movement of the plunger.

6. In combination with a supporting arbor for work, an air operated plunger reciprocable with relation to the arbor, clamping elements supported slidably on the face of the arbor and spaced from a part thereof and movable longitudinally over the face of the work which lies between the elements and the face of the arbor under the influence of said plunger, means to retract the clamping elements upon retraction of the plunger, and a spring pressed pin adapted to be moved by the plunger to loosen the work when the plunger is retracted.

This specification signed this 27th day of October, A. D. 1920.

WALTER L. DIXON.